United States Patent
Uln et al.

(10) Patent No.: US 9,288,715 B2
(45) Date of Patent: *Mar. 15, 2016

(54) METHOD AND SYSTEM FOR IMPROVING THE EFFICIENCY OF PACKET TRANSMISSION IN A MULTI-USER WIRELESS COMMUNICATION SYSTEM

(71) Applicant: Mediatek Inc., Hsin-Chu (TW)

(72) Inventors: Kiran Uln, Pleasanton, CA (US); Thomas E. Pare, Jr., Mountain View, CA (US); Ravishankar H. Mahadevappa, San Jose, CA (US)

(73) Assignee: MEDIATEK INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/321,618

(22) Filed: Jul. 1, 2014

(65) Prior Publication Data

US 2015/0071168 A1   Mar. 12, 2015

Related U.S. Application Data

(63) Continuation of application No. 13/175,746, filed on Jul. 1, 2011, now Pat. No. 8,804,681.

(60) Provisional application No. 61/361,398, filed on Jul. 3, 2010.

(51) Int. Cl.
    H04W 4/00     (2009.01)
    H04W 28/06    (2009.01)
    H04L 1/00     (2006.01)

(52) U.S. Cl.
    CPC .......... *H04W 28/065* (2013.01); *H04L 1/0069* (2013.01)

(58) Field of Classification Search
    None
    See application file for complete search history.

(56) References Cited

U.S. PATENT DOCUMENTS

| 6,801,588  | B1 * | 10/2004 | Yamaguchi | 375/341 |
| 8,804,681  | B2 * | 8/2014  | Uln et al. | 370/338 |
| 2008/0134006 | A1 * | 6/2008  | Xia | 714/776 |
| 2008/0181160 | A1 * | 7/2008  | Dillon | 370/312 |
| 2009/0024680 | A1 * | 1/2009  | Barry et al. | 708/100 |
| 2010/0008408 | A1 * | 1/2010  | Spencer | 375/219 |
| 2010/0260159 | A1 * | 10/2010 | Zhang et al. | 370/338 |

* cited by examiner

*Primary Examiner* — Minh-Trang Nguyen
(74) *Attorney, Agent, or Firm* — Sawyer Law Group, P.C.

(57) ABSTRACT

A method and system utilized in a wireless communication system transmitting and receiving a multi-user packet is disclosed. The communication system includes a transmitter and a plurality of users in communication therewith. The method and system comprise determining a lowest coding scheme for transmitting the packet; and deriving a coding rate for the efficient transmission of the packet from a standard coding rate by de-puncturing bits in the packet. A system and method in accordance with the present invention provides for an efficient utilization of packet length, and improves the reliability by improving SNR, by lowering the MCS, un-puncturing, and/or repetition. More efficient packed data rates are also provided and both Tx and Rx compute parameters independently.

16 Claims, 6 Drawing Sheets

METHOD AND SYSTEM FOR IMPROVING THE EFFICIENCY OF PACKET TRANSMISSION IN A MULTI-USER WIRELESS COMMUNICATION SYSTEM

CROSS-REFERENCE TO RELATED APPLICATIONS

Under 35 U.S.C. 120, this application is a Continuation Application and claims priority to U.S. application Ser. No. 13/175,746, filed Jul. 1, 2011, entitled "METHOD AND SYSTEM FOR IMPROVING THE EFFICIENCY OF PACKET TRANSMISSION IN A MULTI-USER WIRELESS COMMUNICATION SYSTEM," which claims the benefit of U.S. Provisional Application No. 61/361,398, filed on Jul. 3, 2010, entitled "METHOD OF PADDING," all of which are incorporated herein by reference in their entireties.

FIELD OF THE INVENTION

The present invention relates generally to a wireless communication system and more particularly to a system and method for efficiently transmitting and receiving packets in a multi-user communication system.

BACKGROUND

Communication systems can be categorized as conforming to either wired or wireless standards. Implementations can range from local wireless networks in the home, to the national and international cell phone networks, to the Internet.

Each communication system deployed typically conforms to one or more of a number of existing standards. Wireless standards include the IEEE 820.11 wireless local area network (WLAN), the advanced mobile phone services (AMPS), Bluetooth, global system for mobile communications (GSM), code division multiple access (CDMA, local multi-point distribution systems (MMDS) and various proprietary implementations of such standards. A wireless local area network (WLAN) is widely used to provide access to the Internet with mobile devices.

A new standard is proposed under the IEEE standard 802.11ac which provides for a multi-user packet. This standard is different than the 802.11n standard which allows for multiusers but the packet each user receives is unique to that particular user. Hence the packet length for each user is structured for that particular user.

In contrast in 802.11ac a multi user packet is provided. Referring now to FIG. 1, what is illustrated is block diagram of a multi user packet. This packet includes an L-SIG FIELD 12, a VHT-SIG FIELD 14, a VHT-STF FIELD 16, and a VHT-LTF FIELD 18. Thereafter there are three VHT-SIG FIELDS 22a-22c for each of the three users in the multiuser packet 10. Each of the VHT-SIG FIELDS 22a-22c has data 24a-24c associated therewith. Accordingly as is seen, when a multi-user packet is transmitted in these types of networks the packet is not structured across all users. Therefore, the packet length is determined by the data_length/throughout_rate of the user who has the longest packet. In this case, the user associated with VHT-SIG FIELD 22c. In wireless communication networks in order to maintain the transmission characteristics of the network, dummy/useless zeros (possibly scrambled) are padded at the end of the users' data that have shorter data lengths. When performing padding, a transmitter should be active to maintain automatic gain control (AGC) levels and a decoder within the transmitter is allowed to finish early. However, this type of system wastes valuable air time and in the multi user environment, the other users with shorter packets may execute all their data significantly before the packet.

In addition the type of coding scheme that can be utilized the channel utilized is important in efficiency considerations. Under 802.11n or 802.11ac there is a range of modulation and coding scheme (MCS) values that can be utilized by the users and transmitters when handling data within a channel. The values are MCS0 to MSC7. It is also known that the MCS that is chosen is dependent upon the amount of data that need to be transmitted. It is also known that the higher the value of the MCS the higher the signal noise ratio (SNR) and the less power that can be utilized to transmit the data. Furthermore the change in SNR across boundaries can be significant. For example there can be as great as a 3 db difference between data transmitted using MCS4 to that used when transmitting MCS5.

For example, in this embodiment user associated with VHT-SIG HELD 22a may be scheduled for a transmission of video data using MCS7 with nearly 1400 byte packets and 1 packet, user 22b is using VoIP with MCS1 and 7(frame)+20 (codec)+40(ip/udp/rtp)=67 bytes with 2 packets, and the user associated with VHT-SIG FIELD 22c may be transmitting user data using MCS4 with 1024 byte packet. Therefore, the packet length in this example will be max (43, 21, 53)=53 OFDM symbols. This will cause 20% waste in efficiency for the user associated with VHT-SIG HELD 22a and 60% waste in efficiency for the user associated with VHT-SIG FIELD 22b. However, if PER is reduced, the voice quality can be improved for the user associated with VHT-SIG FIELD 22b.

Accordingly it is desirable to use as low a value as possible to improve the efficiency of the wireless communication system. Moreover, feedback and/or channel imperfections will cause variability in signal to noise ratio (SNR) for the various users. Improving the reliability of transmission quality is useful for better utilization of bandwidth/time/stream. In addition, critical information within a packet may require better protection mechanisms associated therewith. Hence, there is a need to provide a method capable of improving the efficiency of the packet formation. The method and system should be adaptable, easy to implement, and cost effective. The present invention addresses such a need.

SUMMARY OF THE INVENTION

A method and system utilized in a wireless communication system transmitting and receiving a multi-user packet is disclosed. The communication system includes a transmitter and a plurality of users in communication therewith. The method and system comprise determining a lowest coding scheme for transmitting the packet; and deriving a coding rate for the efficient transmission of the packet from a standard coding rate by de-puncturing bits in the packet.

A system and method in accordance with the present invention provides for an efficient utilization of packet length, and improves the reliability by improving SNR, by lowering the MCS, un-puncturing, and/or repetition. More efficient packed data rates are also provided and both Tx and Rx compute parameters independently.

BRIEF DESCRIPTION OF DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

Figure 1:
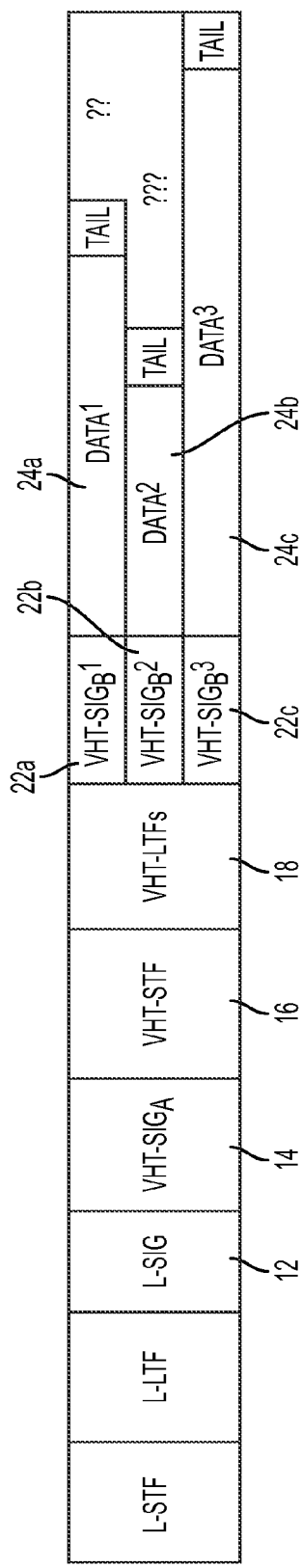
FIG. 1 is a block diagram of a multi user packet in accordance with an embodiment.

The present invention relates generally to a wireless communication system and more particularly to a system and method for efficiently transmitting and receiving packets in a multi-user communication system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention provides for variable de-puncturing and repetition of bits within a packet to optimize the efficiency of the multi-user packet formation. Accordingly firstly the length of the multi user packet versus the data rate the channel is determined for all users. Thereafter a determination is made whether the coding scheme can be reduced to improve efficiency. Thereafter variable de-puncturing of the packet is performed to further improve the efficiency more effectively packing the packet and thereby allow the users of the multiuser packet to operate at a lower value coding scheme.

A system and method that utilizes the variable de-puncturing procedure in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the de-puncturing procedure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

Figure 2:
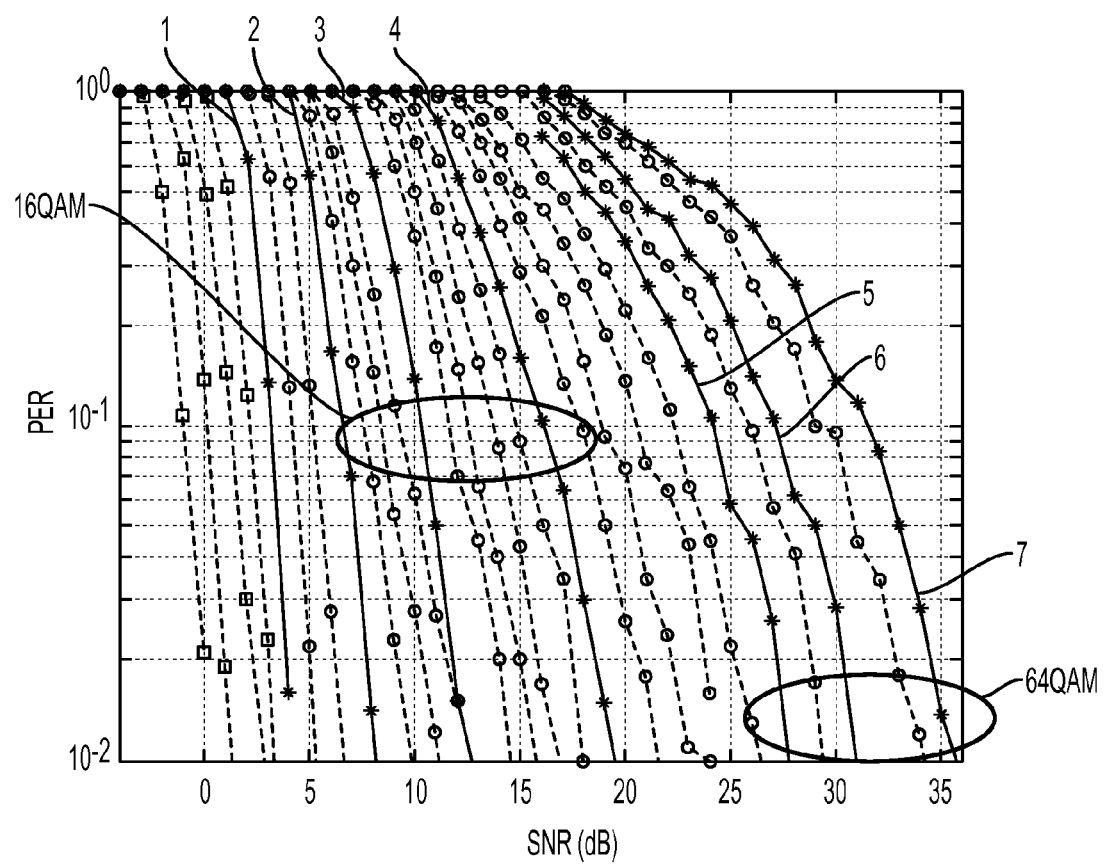
FIG. 2 is a chart which compares the packet error rate (PER) compared to SNR for MSC1-MSC7

As before described it is first determined for the multi user packet whether the packets can be transmitted utilizing a coding scheme. Referring to FIG. 2 which is a chart which compares the packet error rate (PER) compared to SNR for MSC1-MSC7. As is seen. The highest rate supported by MCS4 is 16 QAM whereas the highest rate supported by MCS5 is 64 QAM. As can be seen there is a dramatic difference in SNR when going from MSC4 to MCS5 which can affect signal quality. Therefore it is first determined if the each of the user with the longest packet is can operate at lower MCS level that will still allow for efficient transmission quality. For example if the user with the longest packet is operating at MCS7 the MCS value may be lowered to MCS4 by doubling the coding rate. In so doing the signal quality and efficiency may be improved for all of the users.

Figure 3:
FIG. 3 illustrates different coding rates in accordance with the present invention.

Although this will improve the efficiency of the system there may still be unused area within the packet for one or more of the users. Hence it is desirable to further improve efficiency when transmitting a multi-user packet. Defined coding rates in 802.11ac are 1/2 rate code. 2/3 rate code. 3/4 code and 5/6 rate code. These rates are all derived from the 1/2 rate code by dropping bits periodically. FIG. 3 illustrates different coding rates in accordance with the present invention. As is seen, for the 1/2 code rate no bits are dropped. In the 2/3 coding rate every fourth bit is punctured. For example, in rate 3/5 in FIG. 2, $B_1$, $B_3$, $B_5$, $B_7$, $B_9$ and $B_{11}$ are supposed to be punctured. Since multiple bits are punctured, according to the present invention a de-puncture may be defined by re-inserting bits in a particular pattern. In an example, the particular pattern is suitably balanced between possible multiple streams of data being transmitted.

Therefore, in the 3/5 code rate re-inserting is performed every three punctured bits. In other words, $B_5$ and $B_{11}$ in this embodiment are re-inserted and therefore the "dummy" bit need not be inserted at the receiver side. Similarly, in rate 8/13, re-inserting may be performed every fourth punctured bit. Therefore, $B_7$ in rate 8/13 is re-inserted. This will lead to a result that rate-3/4 may have a puncture pattern [111001] and derived Rate 7-10 with a spacing of 7 has a puncture pattern [111001 111001 111001 111001 111001 111101 111011].

Please note that un-puncturing works for code rate >1/2 (the underlying base code rate). Therefore, according to another embodiment of the present invention, when the coding rate is 1/2, one or both of the following methods can be used, repetition and lowering the modulation for an increased code rate. By doing so, MCS0 and MCS1 will have better gain by repetition. For MCS3 (16-QAM), the modulation is lowered to QPSK and un-puncture from a rate 5/6 code. This will lower the impact on error vector magnitude (EVM) and provide a higher gain in SNR than repetition.

Figure 4:
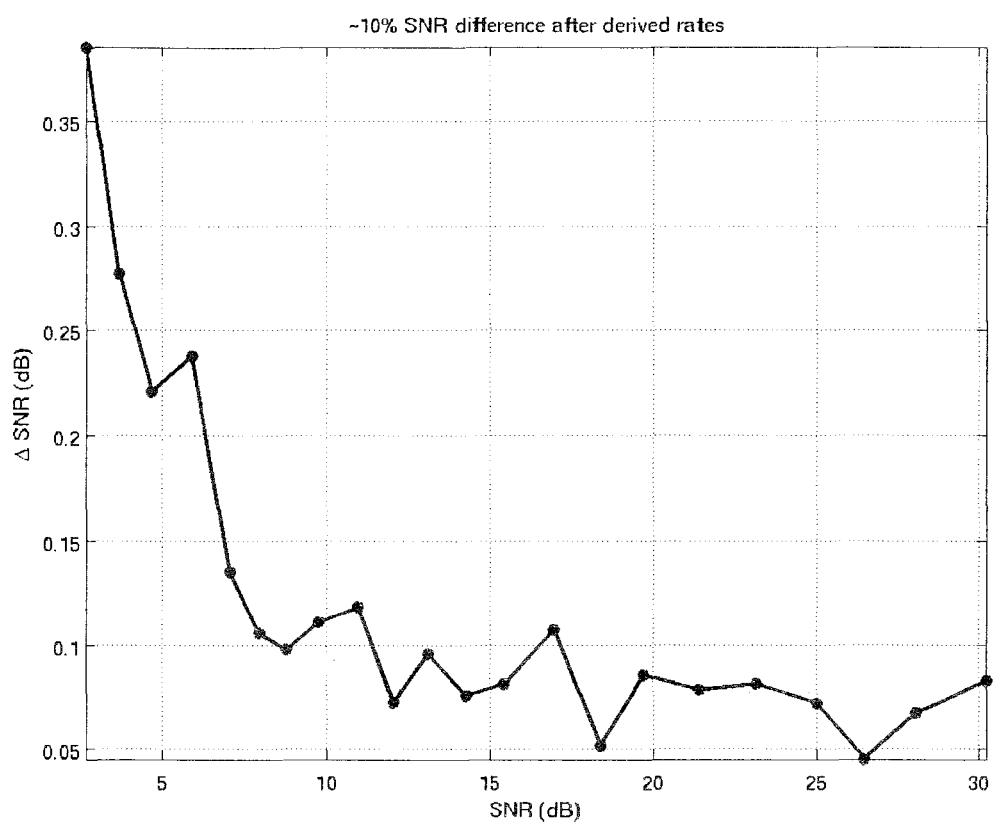
FIG. 4 is a diagram that indicates that the numbers of the derived rates maintain ~10% spacing between the SNRs of the MCS span.

FIG. 2 also illustrates MCS derived from the standard coding rates. The derived code rates are in dotted lines between the standard rates. In this Figure -*- are normal MCS, -o- are derived MCS by un-puncture, and -*- are derived MCS by repetition. As can be seen from FIG. 4, the numbers of the derived rates maintain ~10% spacing between the SNRs of the MCS span.

Figure 5:
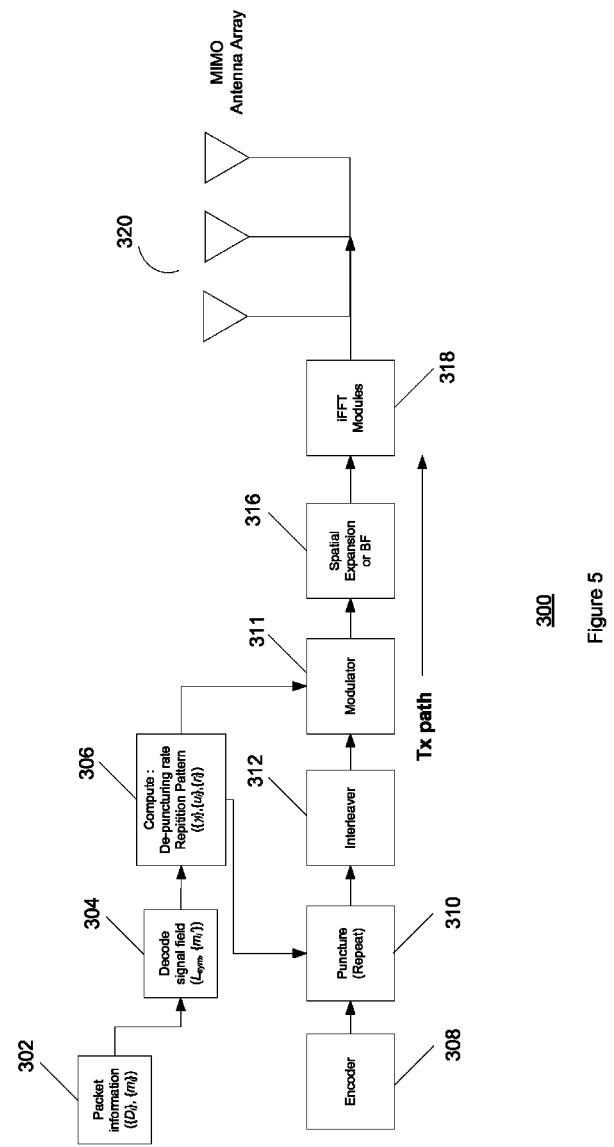
FIG. 5 is a block diagram of a transmit path in accordance with the present invention.

FIG. 5 is a block diagram 300 of a transmit path of the multi-user packet in accordance with the present invention. An encoder 308 provides an encoding scheme to the puncture module 310. Packet information 302 is provided to the signal field module 304. This information is then used to compute the puncturing rate repetition pattern 306. This information is provided to a puncture module 310 and a modulator 311. The puncture module 310 provides a signal to an interleaver 312. The modulator 311 provides a modulated signal to a beamformer 316. The beamformer 316 provides a signal to IFFT modules 318. The signal from the IFFT modules is then outputted on a multi input multi output (MIMO) antenna array 320.

Figure 6:
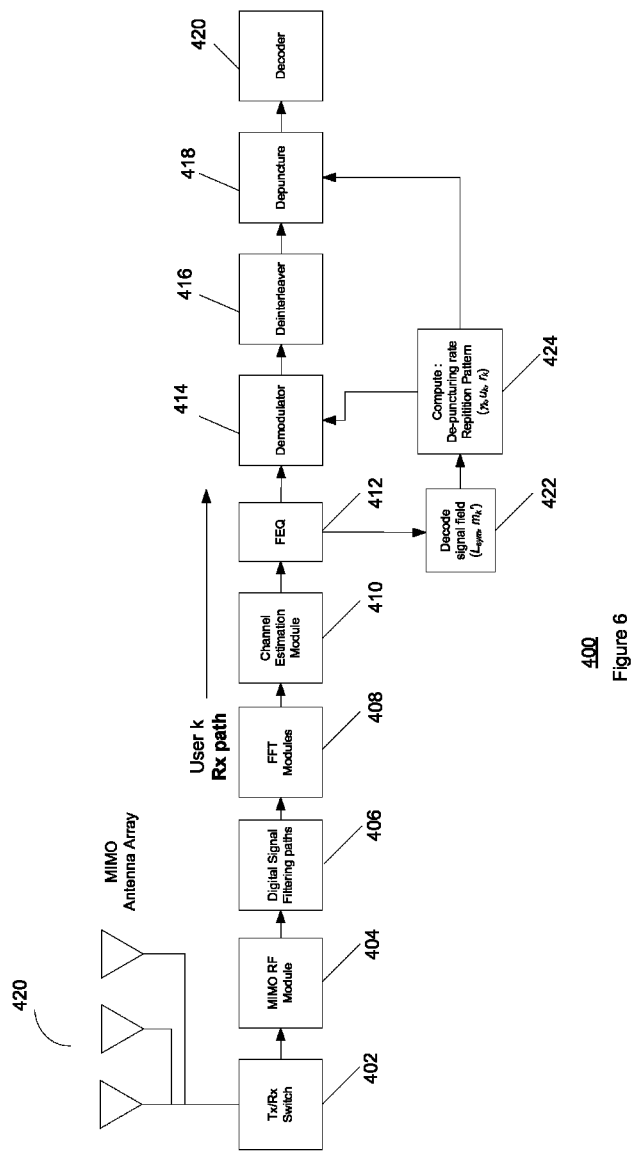
FIG. 6 is a block diagram of a transmit path in accordance with the present invention.

FIG. 6 is a block diagram 400 of a receive path of the multi-user packet in accordance with the present invention. A MIMO antenna array 420 receives the packet. The packet information is then provided to a Tx/Rx Switch 402. The switch 402 provides the signal to a MIMO RF Module 404 which in turn is coupled to digital signal filtering paths 406. The paths 406 are coupled to FFT Modules 408 which in turn is coupled to a channel estimation module 410. The module 410 is coupled to FEQ 412. The output of the FEQ 412 is provided to a decode signal field block 422 and a demodulator 414. The information from the decode signal field block 422 is then used to compute the de-puncturing rate repetition pattern 424 which is then provided to demodulator 414 and the de-puncture module 418. This computation will be the same as that for the transmit path 300. The demodulator 414 provides an output signal to the deinterleaver 416. The deinterleaver 416 provides an output to a de-puncture module 418 which in turn provides an output to a decoder 421.

As is seen, from the above in both the transmit and receive paths de-puncturing rate and repetition pattern is calculated to find the most efficient transmission channel for all users.

Following is a procedure for performing that calculation:
Data lengths $\{D_i\}_{i=0}^{N-1}$
Base MCS $\{m_i\}_{i=0}^{N-1}$
Find length of packet $$L_{SYM} = \max_i \left[ \frac{D_i}{N_{DBPS}(m_i)} \right]$$

Best Lower MCS $$\gamma_i = \frac{N_{DBPS}(m_i')L_{SYM}}{D_i}$$

percent fit in chosen MCS $$m_i' = \operatorname*{argmin}_{j \leq m_i} \left( (N_{DBPS}(j)L_{SYM} - D_i) \overset{>}{\underset{?}{-}} 0 \right)$$

if $R(m_i) \neq 1/2$
Unpuncture $u_1$=Quantize($R(m_i'),\gamma_i$)
else
Repeat X $r_i$=Quantize($R(m_i'),\gamma_i$)
residual bits are padded with 0

By using a system and method in accordance with the present invention, some uncoded bits may span successive OFDM symbols, so the data-aided equalization might have to be handled differently. There are a variety of methods for un-puncturing, and cyclic un-puncture is only an example. For those skilled in the art, those methods are still in the scope of the present invention. For example, repetition can also be made in raw bits or modulated symbols instead of coded bits.

In another example, an optimal pattern for de-puncture is determined by searching though possible repetition patterns.

The last OFDM symbol may have incomplete un-puncture or repetition, so the last OFDM symbol may need a padding of few bits to accommodate packet length.

In general, the present invention provides an efficient utilization of packet length, and improves the reliability by improving SNR, by lowering the MCS, un-puncturing, and/or repetition. More efficient packed data rates are also provided and both Tx and Rx compute parameters independently.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method utilized in a wireless communication system for transmitting and receiving a multi-user packet which comprises a plurality of user packets, the communication system including a transmitter and a receiver with a plurality of users in communication therewith, the method comprising:
   determining a lowest coding rate of a coding scheme for de-puncturing at least one user packet of the plurality of user packets by using decode signal field information including a user packet length; and
   deriving a coding rate for the efficient transmission of the at least one user packet from a standard coding rate by de-puncturing bits in the at least one user packet to extend the user packet length.

2. The method of claim 1, wherein the coding scheme comprises a modulation and coding scheme, wherein the modulation and coding scheme comprises MCS of IEEE standard 802.11 ac.

3. The method of claim 1, wherein a de-puncture is defined by re-inserting bits in a particular pattern.

4. The method of claim 1, wherein the de-puncturing of the bits is performed in a repetitive manner.

5. The method of claim 3, wherein an optimal pattern for de-puncture is determined by searching though possible patterns.

6. The method of claim 3 where the particular pattern is suitably balanced between possible multiple streams of data being transmitted.

7. The method of claim 5 where the optimal pattern is suitably balanced between possible multiple streams of data being transmitted.

8. A receiver utilized in a wireless communications system comprising:
   an antenna array for receiving a multi-user packet comprising a plurality of user packets; and
   a calculating mechanism for determining a lowest coding rate of a coding scheme for de-puncturing at least one user packet of the plurality of user packets by using decode signal field information including a user packet length, and deriving a coding rate for the efficient transmission of the at least one user packet from a standard coding rate by de-puncturing bits in the at least one user packet to extend the user packet length.

9. A transmitter utilized in a wireless communications system for transmission a multi-user packet which comprises a plurality of user packets, the transmitter comprising:
   a calculating mechanism for determining a lowest coding rate of a coding scheme for de-puncturing at least one user packet of the plurality of user packets by using decode signal field information including a user packet length, and deriving a coding rate for the efficient transmission of the at least one user packet from a standard coding rate by de-puncturing bits in the at least one user packet to extend the user packet length; and a decoder for decoding the calculated multi-user packet.

10. A non-transitory computer readable medium containing program instructions for utilized in a wireless communication system for transmitting and receiving a multi-user packet that comprises a plurality of user packets, the communication system including a transmitter and a receiver, the program instruction being executable on a computer, the program instructions comprising:

determining a lowest coding rate of a coding scheme for de-puncturing at least one user packet of the plurality of user packets by using decode signal field information including a user packet length; and deriving a coding rate for the efficient transmission of the at least one user packet from a standard coding rate by de-puncturing bits in the at least one user packet to extend the user packet length.

11. The computer readable medium of claim 10, wherein the coding scheme comprises a modulation and coding scheme, wherein the modulation and coding scheme comprises MCS of IEEE standard 802.11ac.

12. The computer readable medium of claim 10, wherein a de-puncture is defined by re-inserting bits in a particular pattern.

13. The computer readable medium of claim 10, wherein the de-puncturing of the bits is performed in a repetitive manner.

14. The computer readable medium of claim 12, wherein an optimal pattern for de-puncture is determined by searching though possible patterns.

15. The computer readable medium of claim 12, wherein the particular pattern is suitably balanced between possible multiple streams of data being transmitted.

16. The computer readable medium of claim 14, wherein the optimal pattern is suitably balanced between possible multiple streams of data being transmitted.

* * * * *